United States Patent
Wolleschensky

(10) Patent No.: US 7,796,328 B2
(45) Date of Patent: Sep. 14, 2010

(54) LASER SCANNING MICROSCOPE WITH ILLUMINATION PERPENDICULAR TO THE OPTICAL AXIS

(75) Inventor: Ralf Wolleschensky, Apolda (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 258 days.

(21) Appl. No.: 11/808,569

(22) Filed: Jun. 11, 2007

(65) Prior Publication Data

US 2008/0068710 A1 Mar. 20, 2008

Related U.S. Application Data

(63) Continuation of application No. 10/967,322, filed on Oct. 19, 2004, now abandoned.

(30) Foreign Application Priority Data

Jul. 16, 2004 (DE) ........................ 10 2004 034 957

(51) Int. Cl.
*G02B 21/06* (2006.01)
(52) U.S. Cl. ...................... 359/385; 359/387
(58) Field of Classification Search ................. 359/368, 359/385, 387, 389
See application file for complete search history.

(56) References Cited

U.S. PATENT DOCUMENTS

| 1,935,444 | A | * | 11/1933 | Heine | .......................... 359/799 |
| 1,943,510 | A | | 1/1934 | Bauersfeld et al. | |
| 1,996,920 | A | * | 4/1935 | Hauser | ......................... 359/381 |
| 2,097,762 | A | * | 11/1937 | Heine | .......................... 359/386 |
| 2,357,378 | A | | 9/1944 | Benford | |
| 2,809,554 | A | * | 10/1957 | Bernhardt | .................... 359/661 |
| 3,857,626 | A | | 12/1974 | Rosenberger et al. | |
| 3,930,713 | A | * | 1/1976 | Stankewitz et al. | ......... 359/387 |

(Continued)

FOREIGN PATENT DOCUMENTS

DE   34 09 657 A1   9/1985

(Continued)

OTHER PUBLICATIONS

Stelzer et al., High & isotropic resolution with large samples in the selective plane illumination microscope (SPIM), Abstract, Cell Biology and Cell Biophysics Programme, 2004.

(Continued)

*Primary Examiner*—Arnel C Lavarias
*Assistant Examiner*—Mark Consilvio
(74) *Attorney, Agent, or Firm*—Jacobson Holman PLLC

(57) ABSTRACT

Arrangement for microscopic observation and/or detection of a sample that is at least partially transparent by way of a microscope objective, whereby an illumination of the sample outside the objective is carried out from at least from one side at an angle to the optical axis of the objective and the illumination light is focused on the sample with a smaller aperture than that of the viewing objective and that a coupling of the illumination light over a beam splitter, preferably in the objective pupil, is carried out for coupling, at its circumference, slightly expanding transmitting or reflecting areas for steering the illumination light to the sample, but otherwise is designed so that it is reflecting or transmitting for the sample light on the rest of the area.

12 Claims, 6 Drawing Sheets

U.S. PATENT DOCUMENTS

| | | | |
|---|---|---|---|
| 4,127,318 A | | 11/1978 | Determann et al. |
| 4,160,578 A | * | 7/1979 | Gottlieb et al. ............. 359/387 |
| 4,317,613 A | | 3/1982 | Grosser |
| 4,475,796 A | | 10/1984 | Kimura |
| 4,585,315 A | | 4/1986 | Sincerbox et al. |
| 4,626,079 A | | 12/1986 | Nakamura et al. |
| 4,737,022 A | | 4/1988 | Faltermeier et al. |
| 4,881,802 A | | 11/1989 | Stankewitz |
| 4,964,707 A | | 10/1990 | Hayashi |
| 5,268,749 A | * | 12/1993 | Weber et al. ................ 356/446 |
| 5,325,231 A | * | 6/1994 | Tamura et al. .............. 359/387 |
| 5,351,169 A | * | 9/1994 | Ishikawa et al. ............ 362/551 |
| 5,580,162 A | * | 12/1996 | Murakami .................. 362/268 |
| 5,859,727 A | * | 1/1999 | Tsuchiya .................... 359/387 |
| 5,926,311 A | | 7/1999 | Cobb et al. |
| 6,064,518 A | * | 5/2000 | Stelzer et al. ............... 359/368 |
| 6,179,439 B1 | | 1/2001 | Choate |
| 6,259,557 B1 | | 7/2001 | Miyashita et al. |
| 6,392,793 B1 | | 5/2002 | Chuang et al. |
| 6,633,375 B1 | * | 10/2003 | Veith et al. ............... 356/237.4 |
| 2003/0076587 A1 | | 4/2003 | Stelzer et al. |

FOREIGN PATENT DOCUMENTS

| | | |
|---|---|---|
| DE | 196 30 322 A1 | 1/1997 |
| DE | 10 257 237 A1 | 6/2003 |
| EP | 00 19 309 A1 | 11/1980 |
| EP | 05 04 940 A2 | 9/1992 |
| EP | 54 18 08 A1 | 5/1993 |
| GB | 415 342 A1 | 8/1934 |
| GB | 1 493 099 A1 | 11/1977 |
| GB | 2 058 393 A1 | 4/1981 |
| JP | 03142301 A | 6/1991 |
| WO | WO 89 06817 A1 | 7/1989 |

OTHER PUBLICATIONS

Lindek S. et al: "Single-lens theta microscopy—new implementation of confocal theta microscopy," Journal of Microscopy, vol. 188, Nr. 3, Dec. 1997.

Swoger J. et al: "A confocal fiber-coupled single-lens theta microscope," Review of Scientific Instruments, vol. 69, Nr. 8, Aug. 1998.

Lindek S. et al: "Single-lens theta microscopy: resolution, efficiency and working distance," Journal of Modern Optics, vol. 46, Nr. 5, 1999.

Haar F.-M. et al: "Developments and Applications of Confocal Theta Microscopy," SPIE Conference on Three-Dimensional and Multidimensional Microscopy, vol. 3605, Jan. 1999.

M-A Abdul-Karim et al., "Automated tracing and change analysis of angiogenic vasculature from in vivo multiphoton confocal image time series," Microvascular Research 66: 113-125 (2003).

R. Grossman et al., "Juxtavascular Microglia Migrate Along Brain Microvessels Following Activation During Early Postnatal Development," GLIA 37: 229-240 (2002).

Huisken et al., "Optical Sectioning Deep Inside Live Embryos by Selective Plane Illumination Microscope," Science Aug. 13, 2004: 1007-1009.

* cited by examiner

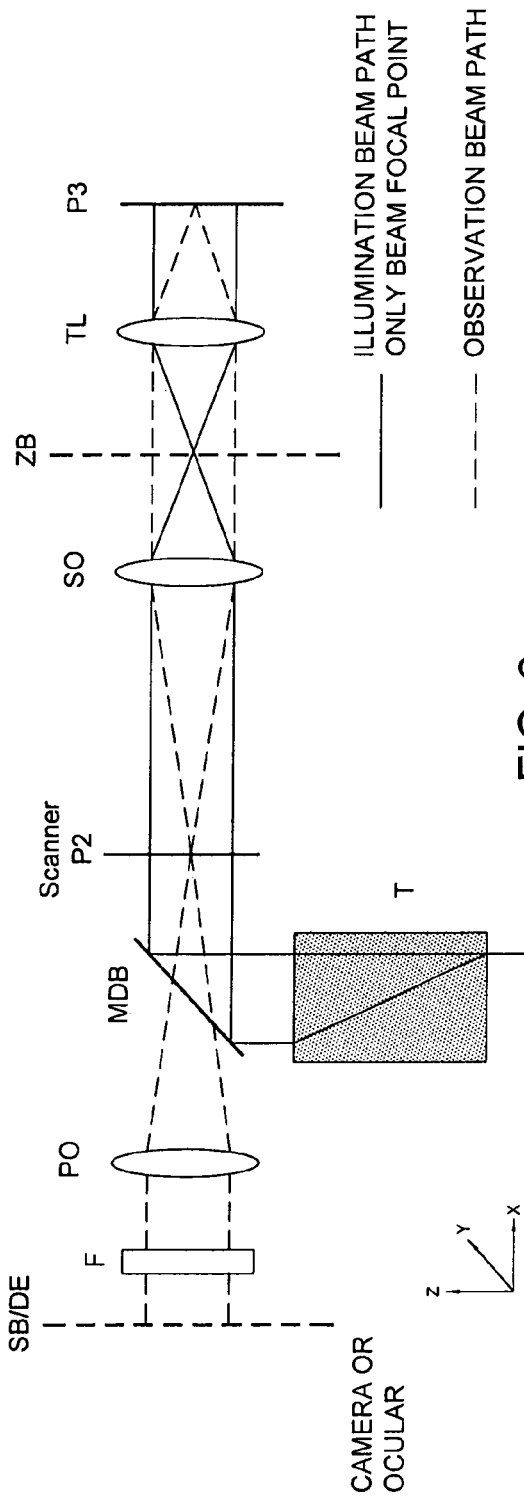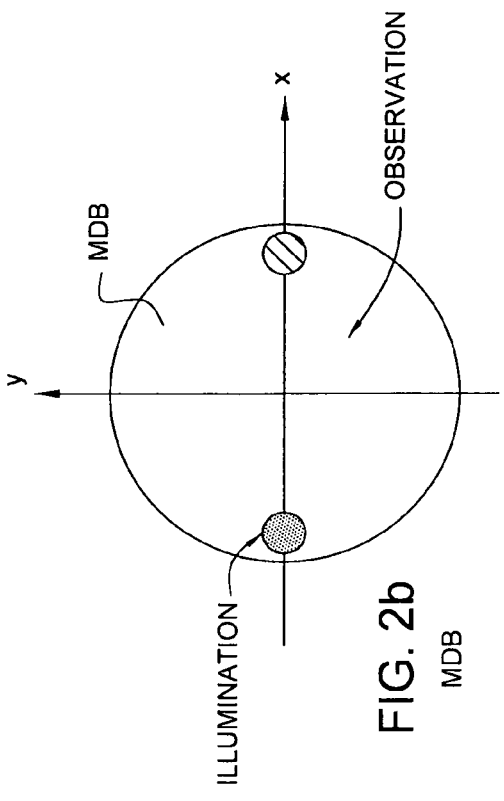
FIG. 2a
FIG. 2b

OBJECTIVE PUPIL P3 (ILLUMINATION)

OBJECT PLANE (ILLUMINATION)

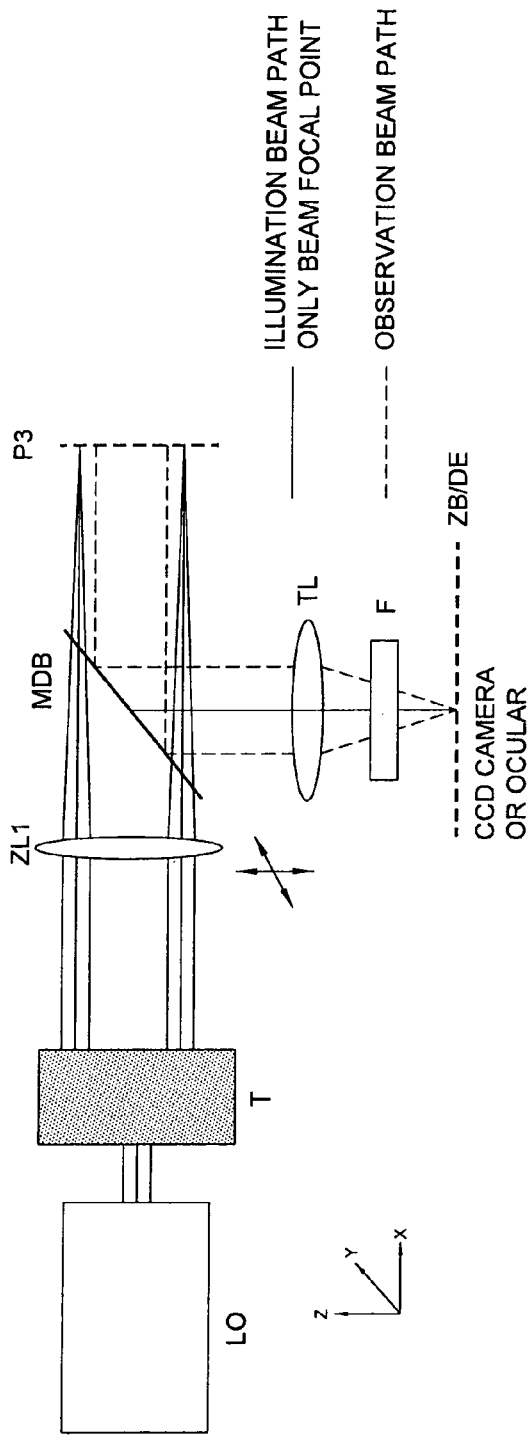
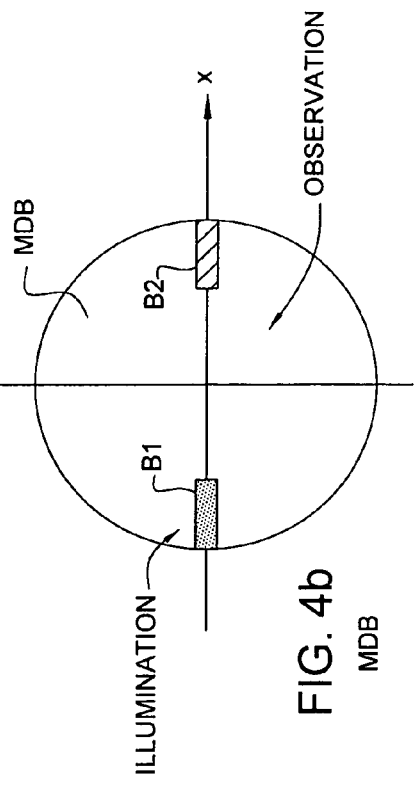

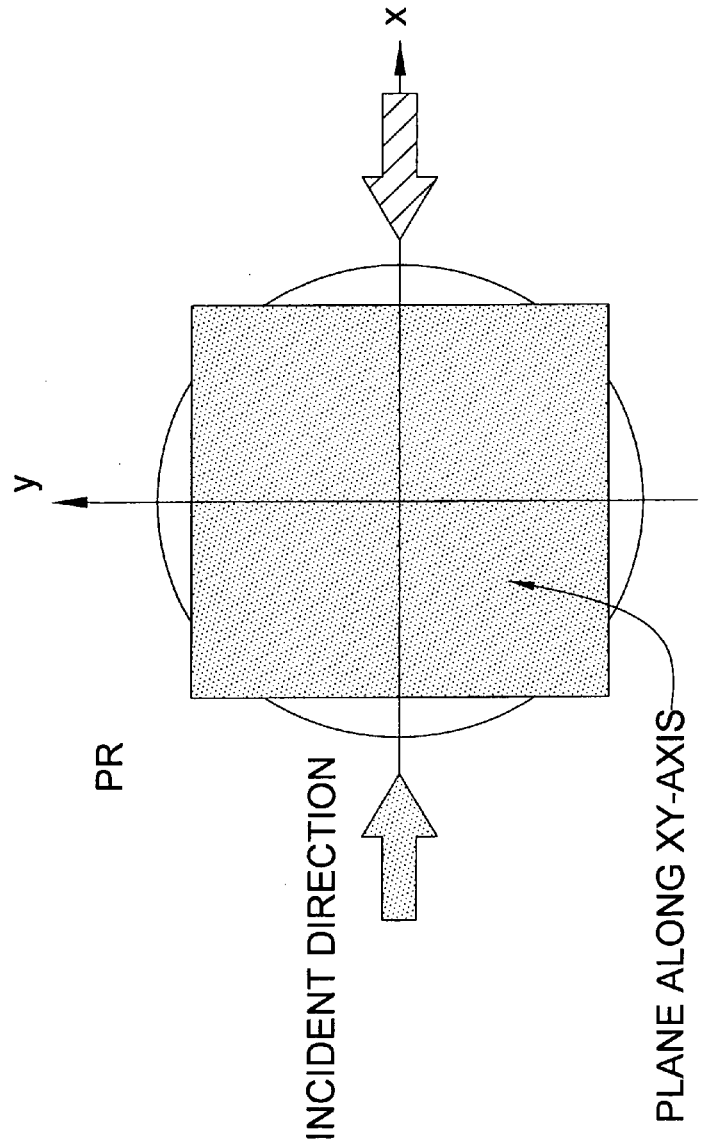

LASER SCANNING MICROSCOPE WITH ILLUMINATION PERPENDICULAR TO THE OPTICAL AXIS

CROSS REFERENCE TO RELATED APPLICATIONS

This is a continuation of application Ser. No. 10/967,322 filed Oct. 19, 2004 now abandoned which is incorporated in its entirety by reference herein.

This application is related to U.S. patent application Ser. No. 10/967,317 which was also filed on Oct. 19, 2004.

BACKGROUND OF THE INVENTION

The present invention relates to an arrangement for microscopic observation and/or detection of a sample that is at least partially transparent by way of a microscope objective.

RELATED ART

Stelzer, et al. describe a further development of the "Theta microscope," as it is called (Lindek, et at.; Journal of modern optics, 1999, vol. 46, no. 5, 843-858) in which the detection is at an angle of 90 degrees to the illumination, the "SPIM," as it is called (selective plane illumination microscope)

(http://www.focusonmicroscopy.org/2004/abstracts/091_Steizer.pdf).

SUMMARY OF THE INVENTION

The invention, as it is the object of the patent claims and its advantages will be described in more detail below.

As a deviation from the known Theta structure, in this case advantageously a mirroring is carried out on the edge outside the actual viewing lens, e.g. using imaging mirrors with small numerical aperture that is mechanically a part of the objective, in order to achieve a very homogeneous Z resolution along a line or surface that is created.

After a light branching (splitter) for parallel laser illumination of several sides, advantageously parallel beams go through a main color splitter, which is also designed as in DE10257237, the disclosure contents of which can be included here, and a scanning optics to the sample.

In the sample, there is focusing on one point from at least one side with low numerical aperture, thereby a very flat asymmetrical beam develops that is quasi-equally distributed on the inside of the sample (constant contraction).

The thickness of the line or surface can be adjusted using the focal length/numerical aperture.

From above, through the lens, there is a viewing (detection) of the illuminated points along this asymmetrical beam with a line or surface detector.

The depth resolution is specified by the focal length/numerical aperture of the mirroring from the side. With a line scanner it can also be adjusted by a confocal aperture diaphragm that is located before the line detector.

The beam splitter is advantageously arranged in the lens diaphragm plate (of the viewing objective) and on the edge, has two points or bars for reflection of the quasi-parallel light beams in the direction of the objective.

Otherwise it is designed so that it is permeable for sample light.

A reversal (illumination over small transmitting areas) and viewing of the reflected sample light is also an object of the invention.

In the line scanner, a line is detected.

In the sample, a line is generated and the fluorescence along this line is imaged on a line detector. Shadows are eliminated because of the illumination on both sides. In principle, it would also be possible to illuminate from only one side. In order to generate this line, focusing on the spot is carried out using lateral illumination. Therefore, a circular distribution of the small cross section is provided on the mirror in the objective pupil.

The line generated in the object is moved over the object by the scanner present in the pupil (conjugate plane).

The scanner descans the line again in the direction of the detection and images it on a line detector.

The return light from the sample goes through the partial mirror in the direction of the line detector.

The edge area of a reflective strip according to 7563 could also be used with illumination with two points.

In this case, some efficiency would be lost through the uninterrupted strip in the SPIM application. In addition, the objective would have to be replaced with the one described above during line detection.

In wide field, for example, a cylinder lens or other suitable optics and the mirrors generate an illumination line along the y-axis so that a viewing area occurs in the xy-plane.

For this it is focused into the pupil in the y-direction, and with that an illumination line is created.

The objective has reflectors, at least in the area of the illumination.

The dimensions are sized such that in wide field a light band can be transferred, whereby this formation can also be used with point beams from the side (image at different times in different areas of the mirror).

The mirrors (imaging mirrors) focus parallel beams on the optical axis of the inner objective, the reverse focal planes of the mirrors lie in the objective pupil.

An inner lens is used for viewing (detection). In the outer area, no optics are required, an optical effect of the outer ring by using corresponding optics with small aperture is only necessary.

The optical section thickness (along the optical axis of the inner objective) is adjusted with the selection of the outer focal length (influence of beam diameter).

It could be adjusted variably with variable optics.

The mirror optics can be circular, i.e. for rotation-symmetrical illumination of the sample from all sides. This arrangement is especially advantageous during wide field detection. When a line scanner is used, the illumination of the sample is preferably carried out with a ring segment, i.e. from a fixed specified direction. Along the imaged axis, which runs perpendicular to the optical axis, this can be carried out using illumination from one direction or two directions opposite to each other. The two illumination beams preferably form a common focus point in the sample.

The objective can be designed as an immersion objective. In this case, the space from the sample to the first lens surface, including the mirroring optics, are immersed appropriately from the side.

All points along the line or area through the sample are recorded parallel through the line or in wide field without the necessity of increasing the intensity. (For example, Raman application, with a point scanner would stress the sample with the full power at each point to beyond the destruction limit (heating). If the sample will be read out at the same image rate, a reduction in the power is conceivable. By the paralleling of the sample measurement, the integration time can be increased accordingly for this, so that the measured signal is constant after expiration of the longer integration time.

The energy input for generating the same signal per sample volume is identical to that of a regular LSM point scanner, since the direction of incidence lies in the plane of the optical section to be detected.

No higher requirements of the light sources exist—but a complete paralleling can be used.

No increased energy input is necessary to achieve the same SNR in a line scanner and thus a lower sample stress occurs.

This allows the option of examining weak sample interactions, e.g. Raman effects.

No special sample preparation is necessary.

The invention can be adapted to a line scanner especially advantageously, with the use of the scanner that scans the line over the sample and with the use of elements for overlaying the illumination and/or extracting the detection (beam splitter mirror), whereby especially advantageous areas of a beam splitter designed according to DE10257237 can be used.

Attachment of the objective according to the invention in a suitable pupil is advantageously possible.

BRIEF DESCRIPTION OF THE DRAWINGS

FIG. 2a shows an objective arrangement with a line scanner connection.

FIG. 2b shows a beam splitter having on its edge opposite circular reflecting partial sections.

FIG. 4a shows an objective arrangement with a connection to a far-field detector.

FIG. 4b shows the plane of the objective pupil on the beam splitter with wide field illumination.

FIG. 4c shows the scanned light area in the sample plane.

DETAILED DESCRIPTION OF THE PREFERRED EMBODIMENTS

Figure 1:
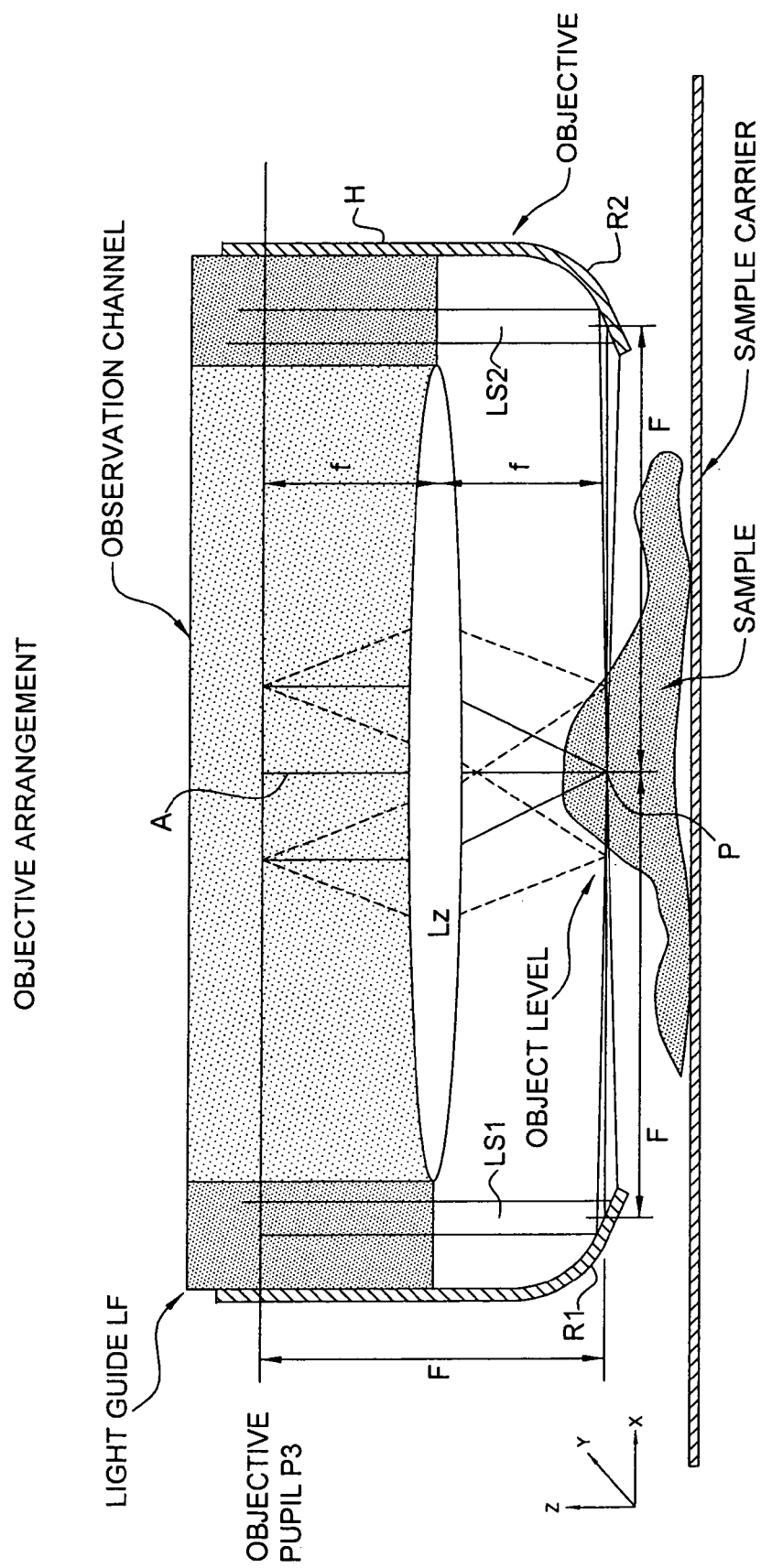
FIG. 1 shows an objective arrangement in accordance with the present invention.

In the following there is a further description using the drawings:

FIG. 1 shows an objective arrangement that consists of a central lens unit Lz, in which it may be a case of a usual viewing object of a microscope.

In a housing H, outside the lens unit Lz, light guides LF are provided in which parallel illumination beams Ls1, Ls2 run in the direction of the sample, at first parallel to the optical axis A of viewing in Lz. The illumination beams Ls1, Ls2 arrive at the reflectors R1, R2, mounted on housing H, which can be imaging mirrors with small aperture, and focus the illumination beams in a direction perpendicular to the optical viewing axis in a point P of the optical axis of the objective Lz.

Figure 1A:
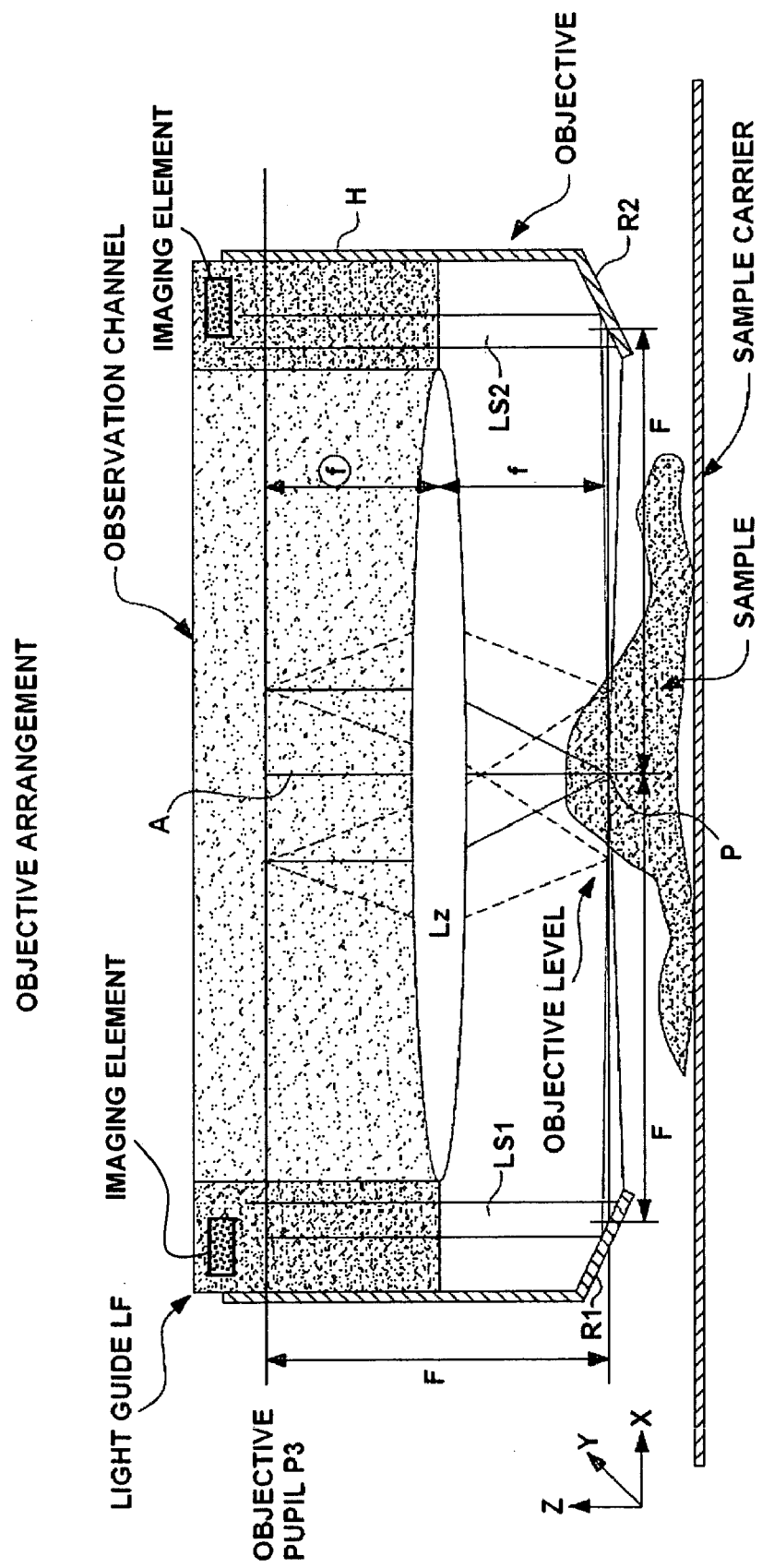
FIG. 1a shows an alternative embodiment of an objective arrangement in accordance with the present invention.

As shown in FIG. 1a, R1, R2 can also be flat reflecting mirrors and then display elements with small aperture can be provided in the light guides LF, whereby R1, R2 are used only for deflection in the direction of the sample and the focus in the sample will be generated by the imaging elements.

Because of the small aperture, the waist of the illumination runs almost parallel in the area of the sample and generates, in the sample, a thin illumination line that is imaged in objective pupil P3.

Objective pupil P3, objective Lz and the sample focus P are located here in a 2f arrangement, i.e. in each case at a distance from each other that equals the simple focal length f, so that the distance between the objective pupil P3 and the sample focus P is 2f (represented in FIG. 1 as "F").

Because of this, the objective can be used for telecentric scanning, for example of an illumination line in the sample.

In FIG. 2a, which applies to the objective pupil P3, a light source LQ is mounted below a beam splitter T that creates two parallel partial beams Ls1, Ls2 that are reflected over a beam splitter MDB and are transferred over a scanner P2 for movement of the illumination beams over the sample in one direction, scanning optics SO and a tube lens TL for transfer of an intermediate image ZB onto the objective pupil P2. The beam splitter MDB lies in the conjugate plane of the objective pupil, this beam splitter having on its edge opposite circular reflecting partial sections (FIG. 2b).

Advantageously, the attachment of the objective according to the lens takes place over the pupil P3 to the beam of a line scanner, which has an appropriately designed beam splitter, as already described in DE10257237 A21, and the transmitting or reflecting surfaces of which can be used.

The illumination line described here is moved through the sample by way of the scanner P2 (in the pupil P3) of the line scanner.

The viewing beam is dotted, the illumination beam is a solid line. The image of the sample in the intermediate image ZB is descanned by way of a tube lens, scanning optics and scanner and is imaged onto a slot shutter SB (optional here) in front of a line detector DE, through the surface of the beam splitter MDB necessary for the sample irradiation (except for the circular reflecting points) by means of pinhole optics PO.

Figure 3A:
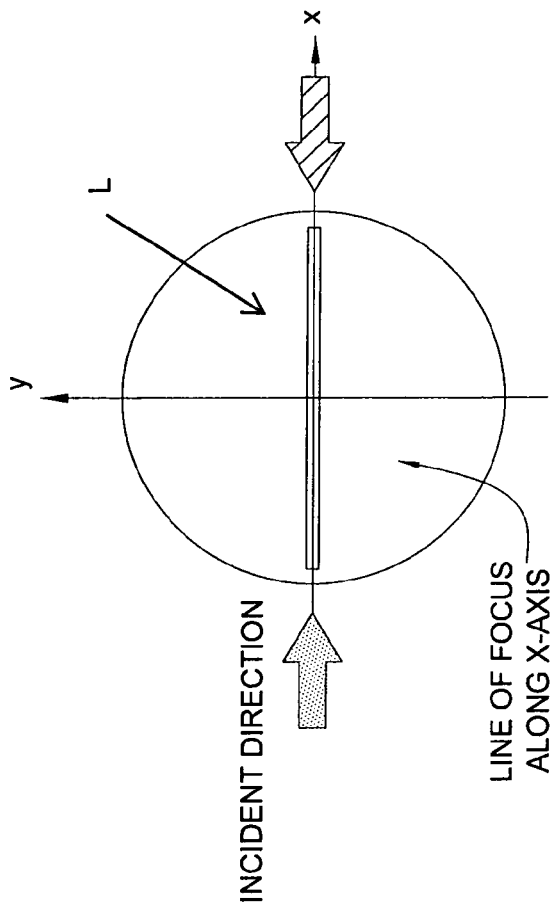
FIG. 3a shows the cross section of the objective pupil on the beam splitter with the illumination channels BK and the effective area for the viewing FB.

FIG. 3a shows the cross section of the objective pupil on the MDB with the illumination channels BK and the effective area FB for the viewing.

Figure 3B:
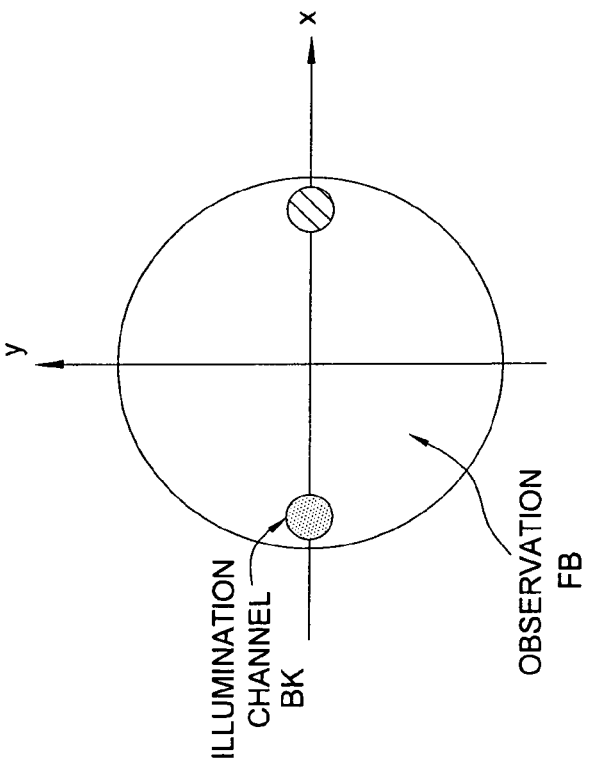
FIG. 3b shows an illuminated line L in the object plane, on which focusing is carried out with the objective.

FIG. 3b shows the illuminated line L in the object plane, on which focusing is carried out with the objective and by means of which the detection is recorded. The thickness of the line is adjusted, in that the effective numerical aperture of the lateral optics that is focused with variation along the beam direction in the sample. If this NA is decreased, the line width increases accordingly. The manipulation of the numerical aperture can also be e.g. by a variable ring shutter in the pupil that is not shown, arranged around the illumination channel. By moving the scanner P2 perpendicular to the longitudinal direction (x axis), the line is moved perpendicular in y direction on the sample.

FIG. 4a shows the arrangement for wide field illumination. In this case a splitter can be used for illumination of the sample from two irradiation directions.

FIG. 4b shows the plane of the objective pupil on the beam splitter MDB with wide field illumination.

This advantageously has two line-shaped transmitting areas B1, B2 that are opposite each other on the outer edge, each of which transfers a line-shaped area of the illumination (dotted line) in the direction of the outer area of the objective. These areas are imaged with the reflectors in the direction of the sample with small aperture and form a quasi-parallel surface light area of small thickness through the sample. The adjustment of the thickness is carried out, in turn, by a shutter in the pupil, which is not shown, that contracts the pupil of the illumination channel along the x axis at the location of the pupil.

The objective according to the invention is advantageously connected by way of a pupil P3 as in FIG. 2a to the beam of a line scanner.

The illumination is focused in the y direction by a cylinder lens.

Optionally a splitter T (e.g. double-refractive medium) can be located in the illumination beam to generate 2 partial beams.

FIG. 4c shows the scanned light area in the sample plane (focal plane of the objective).

The sample light (in dotted lines) goes over the beam splitter MDB (reflecting) in the direction of an area detector DE. A Powell aspherical can optionally be used in front of the cylinder optics ZL1 in FIG. 4a for homogenizing the illumination along the y-axis.

The invention described represents an important expansion of the application possibilities of fast confocal laser scanning microscopes. The importance of such a further development can be understood from reading the standard cell biology literature and the fast cellular and subcellular processes described there and the testing methods used there with a large number of dyes.

For example, see:

B. Alberts et al. (2002): Molecular Biology of the Cell; Garland Science.

G. Karp (2002): Cell and Molecular Biology: Concepts and Experiments; Wiley Text Books.

R. Yuste et al. (2000): Imaging neurons—a laboratory Manual; Cold Spring Harbor Laboratory Press, New York.

R. P. Haugland (2003): Handbook of fluorescent Probes and research Products, 10th Edition; Molecular Probes Inc. and Molecular Probes Europe BV.

The invention has especially great importance for the following processes and procedures:

Development of Organisms

The invention described is suitable, among other things, for the examination of development processes, which are mainly characterized by dynamic process in the range of tenths of a second to hours. Example applications on the level of symplasts and complete organisms are described here as an example:

Abdul-Karim, M. A. et al. describe, in 2003 in Microvasc. Res., 66:113-125, a long-term analysis of blood vessel changes in the living animal, wherein fluorescence images were recorded at intervals over several days. The 3D data records were evaluated with adaptive algorithms in order to schematically represent movement trajectories.

Soll, D. R. et al. describe, in 2003 in Scientific World Journ. 3:827-841, a software-based movement analysis of microscopic data of nuclei and pseudopods of living cells in all 3 spatial dimensions.

Grossmann, R. et al. describe, in 2002 in Glia, 37:229-240 a 3D analysis of the movements of rat microglial cells, whereby the data were recorded over up to 10 hours. At the same time, there were also fast reactions of the glia after traumatic, so that a high data rate and corresponding data volume occurred.

This relates especially to the following focal points:

Analysis of living cells in 3D environment, whose adjacent cells react sensitively to laser illumination and have to be protected from the illumination of the 3D-ROI;

Analysis of living cells in 3D environment with labels, that will be selectively bleached by laser light in 3D, e.g. FRET experiments;

Analysis of living cells in 3D environment with labels, that will be selectively bleached by laser light in 3D and simultaneously will also be observed outside the ROI, e.g. FRAP AND FLIP experiments;

Selective analysis of living cells in 3D environment with labels and pharmaceuticals that exhibit manipulation-related changes due to laser illumination, e.g. activation of transmitters in 3D;

Selective analysis of living cells in 3D environment with labels that exhibit manipulation-related color changes due to laser illumination, e.g. paGFP, Kaede;

Selective analysis of living cells in 3D environment with very weak labels that e.g. require an optimum balance of confocality and detection sensitivity.

Living cells in a 3D tissue structure with varying multiple labels, e.g. CFP, GFP, YFP, DsRed, HcRed, etc.

Living cells in a 3D tissue structure with labels, that have color changes depending on function, e.g. Ca+-Marker Living cells in a 3D tissue structure with labels, that have color changes due to development, e.g. transgenic animals with GFP Living cells in a 3D tissue structure with labels, that have manipulation-related color changes due to laser illumination, e.g. paGFP, Kaede Living cells in a 3D tissue structure with very weak labels that require a restriction of the confocality in favor of the detection sensitivity.

The latter-named point in combination with the preceding.

The invention claimed is:

1. A laser scanning microscope for detecting at least one sample region, comprising:

means for creating at least one bundle of parallel illumination beams, a microscope objective including a housing, viewing optics for viewing at least partially transparent samples, at least one light guide in the housing outside of the viewing optics for guiding the at least one bundle of parallel illumination beams, an objective aperture, and means for diverting the at least one bundle of parallel illumination beams for illuminating the sample from at least one side at an angle perpendicular to the optical axis of the viewing optics, and for generating an illumination line in the sample perpendicular to the optical axis of the viewing optics by focusing the at least one bundle of parallel illumination beams into the sample, an aperture smaller than the objective aperture, at least one scanner for moving the illumination line in a scanning manner through and across the sample to generate a sample image, and a locally resolving detector in a detection beam path for detecting the sample image, wherein the viewing optics and the scanner image the sample image in a detection direction onto the locally resolving detector.

2. The laser scanning microscope according to claim 1, wherein the means for diverting and generating includes an imaging mirror which focuses the illumination light in the direction of the sample.

3. The laser scanning microscope according to claim 1, wherein the means for diverting and generating includes a planar mirror and an imaging element in the light guide.

4. The laser scanning microscope according to claim 1, wherein there are two bundles of parallel illumination beams and wherein the means for diverting and generating includes two reflectors for illuminating the sample from two sides with a common focal point.

5. The laser scanning microscope according to claim 2, wherein there are two bundles of parallel illumination beams and wherein the means for diverting and generating includes two reflectors for illuminating the sample from two sides with a common focal point.

6. The laser scanning microscope according to claim 3, wherein there are two bundles of parallel illumination beams and wherein the means for diverting and generating includes two reflectors for illuminating the sample from two sides with a common focal point.

7. The laser scanning microscope according to claim 1, further comprising a beam splitter including on its circumference transmitting regions that are slightly expanded for coupling in the at least one bundle of parallel illumination beams and directing it to the sample, substantially the remainder of the area of the beam splitter being formed to reflect the sample light.

8. The laser scanning microscope according to claim 7, further comprising an objective pupil, wherein the beam splitter is in the objective pupil.

9. The laser scanning microscope according to claim 1, further comprising a beam splitter including on its circumference reflective regions that are slightly expanded for coupling in the at least one bundle of parallel illumination beams and directing it to the sample, substantially the remainder of the area of the beam splitter being formed to transmit the sample light.

10. The laser scanning microscope according to claim 9, further comprising an objective pupil, wherein the beam splitter is in the objective pupil.

11. Method for the examination of weak sample interactions, comprising detecting at least one sample region using the laser scanning microscope as claimed in claim 1.

12. The method of claim 11, wherein the weak sample interactions are Raman effects.

* * * * *

UNITED STATES PATENT AND TRADEMARK OFFICE
CERTIFICATE OF CORRECTION

PATENT NO. : 7,796,328 B2
APPLICATION NO. : 11/808569
DATED : September 14, 2010
INVENTOR(S) : Wolleschensky It is certified that error appears in the above-identified patent and that said Letters Patent is hereby corrected as shown below:

Column 1, lines 28-29, change "http://www.focusonmicroscopy.org/2004/abstracts/091_Steizer.pdf"
to --http://www.focusonmicroscopy.org/2004/abstracts/091_Stelzer.pdf--

Signed and Sealed this
Twenty-second Day of March, 2011

David J. Kappos
*Director of the United States Patent and Trademark Office*